United States Patent
Wu et al.

(10) Patent No.: US 12,212,938 B2
(45) Date of Patent: Jan. 28, 2025

(54) SYSTEMS AND METHODS FOR ACOUSTIC BEHAVIOR FEEDBACK

(71) Applicant: Google LLC, Mountain View, CA (US)

(72) Inventors: Christine Jean Wu, San Francisco, CA (US); Shokofeh Darbari, Palo Alto, CA (US); Shane Anton Myrbeck, Los Angeles, CA (US); Caitlin Emily Riggs, San Francisco, CA (US); Jack Godfrey Wood, San Francisco, CA (US); Andy Furner, London (GB); Harc Lee, London (GB)

(73) Assignee: GOOGLE LLC, Mountain View, CA (US)

(*) Notice: Subject to any disclaimer, the term of this patent is extended or adjusted under 35 U.S.C. 154(b) by 14 days.

(21) Appl. No.: 18/091,738

(22) Filed: Dec. 30, 2022

(65) Prior Publication Data
US 2024/0223981 A1    Jul. 4, 2024

(51) Int. Cl.
| | |
|---|---|
| H04R 29/00 | (2006.01) |
| G01H 3/12 | (2006.01) |
| G08B 5/36 | (2006.01) |
| G08B 21/18 | (2006.01) |

(52) U.S. Cl.
CPC .......... *H04R 29/008* (2013.01); *G01H 3/125* (2013.01); *G08B 5/36* (2013.01); *G08B 21/182* (2013.01)

(58) Field of Classification Search
CPC ....... G06F 3/165; H04R 3/12; H04R 2430/01; H04R 27/00
See application file for complete search history.

(56) References Cited

U.S. PATENT DOCUMENTS

| | | |
|---|---|---|
| 2002/0186129 A1 | 12/2002 | Rebello |
| 2011/0201381 A1* | 8/2011 | Herz .............. G06F 1/3203 455/550.1 |
| 2016/0163302 A1 | 6/2016 | Klabunde et al. |
| 2021/0029789 A1* | 1/2021 | Ganick ........... H05B 45/20 |
| 2022/0159812 A1 | 5/2022 | Justin |
| 2022/0408178 A1* | 12/2022 | Choi ............... H04R 1/1016 |
| 2023/0244437 A1* | 8/2023 | Doken ............. G06F 3/165 381/57 |
| 2023/0282080 A1* | 9/2023 | Mulliken ......... A61B 5/168 340/573.1 |

FOREIGN PATENT DOCUMENTS

DE    2020/10002987    6/2010

OTHER PUBLICATIONS

International Search Report and Written Opinion for Application No. PCT/USA2023/086405, mailed Apr. 5, 2024, 15 pages.

* cited by examiner

*Primary Examiner* — Mirza F Alam
(74) *Attorney, Agent, or Firm* — DORITY & MANNING P.A.

(57) ABSTRACT

A system for acoustic behavior feedback includes a light emitter and a microphone. Ambient sound data from the microphone may be compared to a threshold sound level, and one of a plurality of settings for the light emitter may be selected based at least in part on the comparison between the ambient sound data and threshold sound level. Each of the plurality of settings corresponds to a respective sound level alert as feedback for at least one person proximate the microphone and the light emitter.

20 Claims, 7 Drawing Sheets

SYSTEMS AND METHODS FOR ACOUSTIC BEHAVIOR FEEDBACK

FIELD

The present disclosure relates generally to systems and methods for acoustic behavior feedback, e.g., in shared workspaces.

BACKGROUND

Modern workspaces frequently include open floorplans with numerous desks disposed within shared spaces. In some open floorplans, low partitions are provided between adjacent desks. In other open floorplans, no partitions are provided between adjacent desks. Thus, privacy between adjacent workspaces can be limited, which can reduce productivity in some situations.

Shared workspaces can also be noisy working environments. For example, talking coworkers can be a significant source of ambient noise in shared workspaces. Coworkers can also generate significant noise by listening to music, tapping objects, and other actions. Certain workers in shared workspaces can find the ambient noise level inherent in such arrangements distracting. Thus, noisy shared workspaces can be difficult for some workers and limit productivity.

A system workspace with features for reducing ambient noise would be useful.

SUMMARY

Aspects and advantages of embodiments of the present disclosure will be set forth in part in the following description, or may be learned from the description, or may be learned through practice of the embodiments.

Aspects of the present disclosure are directed to a system for acoustic behavior feedback. The system includes a light emitter, a microphone, one or more processors, and one or more non-transitory computer-readable media that store instructions that, when executed by the one or more processors, cause the one or more processors to perform operations. The operations include comparing ambient sound data from the microphone to a threshold sound level, and selecting one of a plurality of settings for the light emitter based at least in part on the comparison between the ambient sound data and threshold sound level. Each of the plurality of settings corresponds to a respective sound level alert as feedback for at least one person proximate the microphone and the light emitter.

Aspects of the present disclosure are also directed to a method for acoustic behavior feedback. The method includes comparing ambient sound data from a microphone to a threshold sound level, and selecting one of a plurality of settings for a light emitter based at least in part on the comparison between the ambient sound data and threshold sound level. Each of the plurality of settings corresponds to a respective sound level alert as feedback for at least one person proximate the microphone and the light emitter.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures.

DETAILED DESCRIPTION

Figure 1:
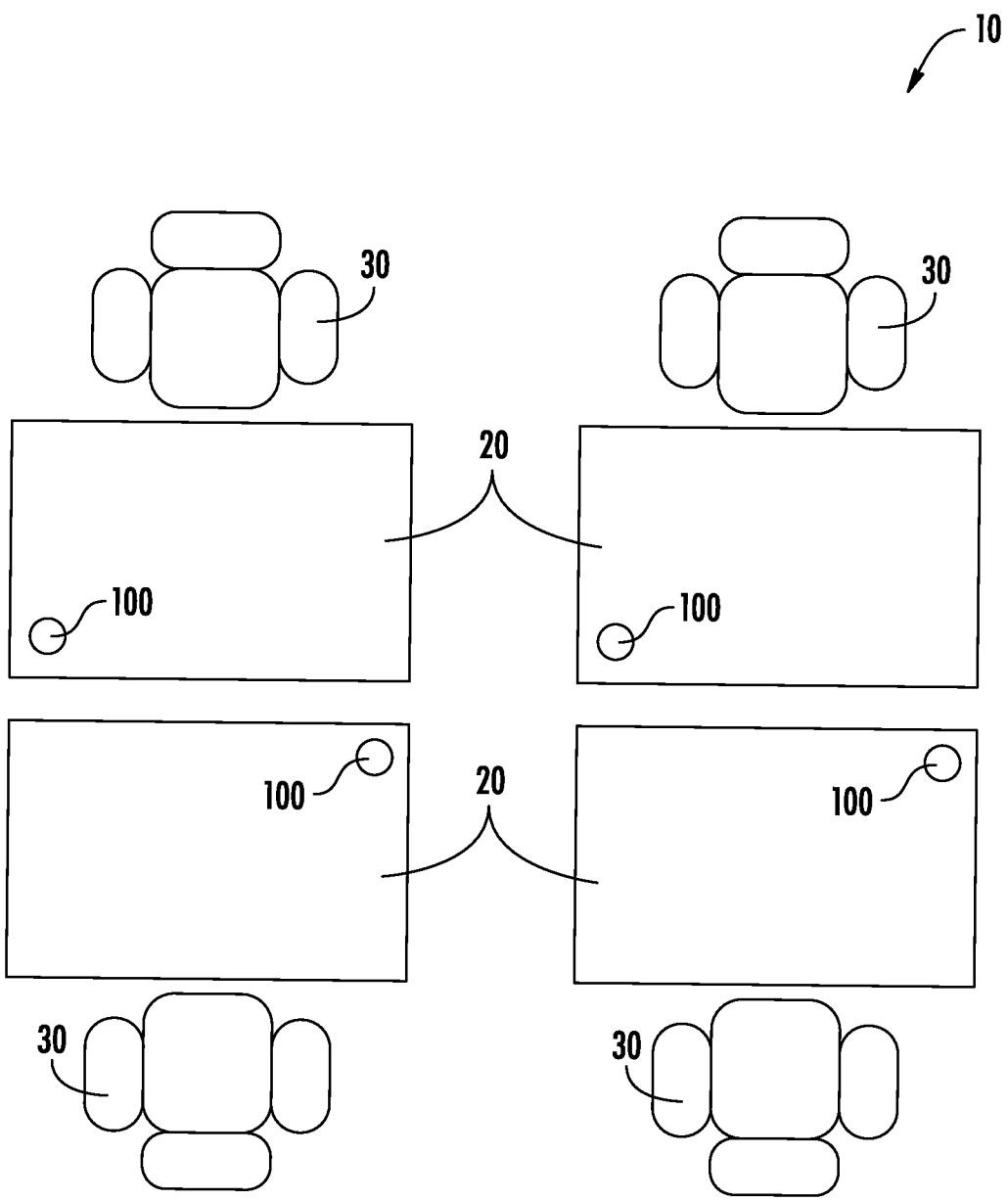
FIG. 1 is a top plan view of a workspace and a system for acoustic behavior feedback according to an example embodiment of the present subject matter.
Figure 2:
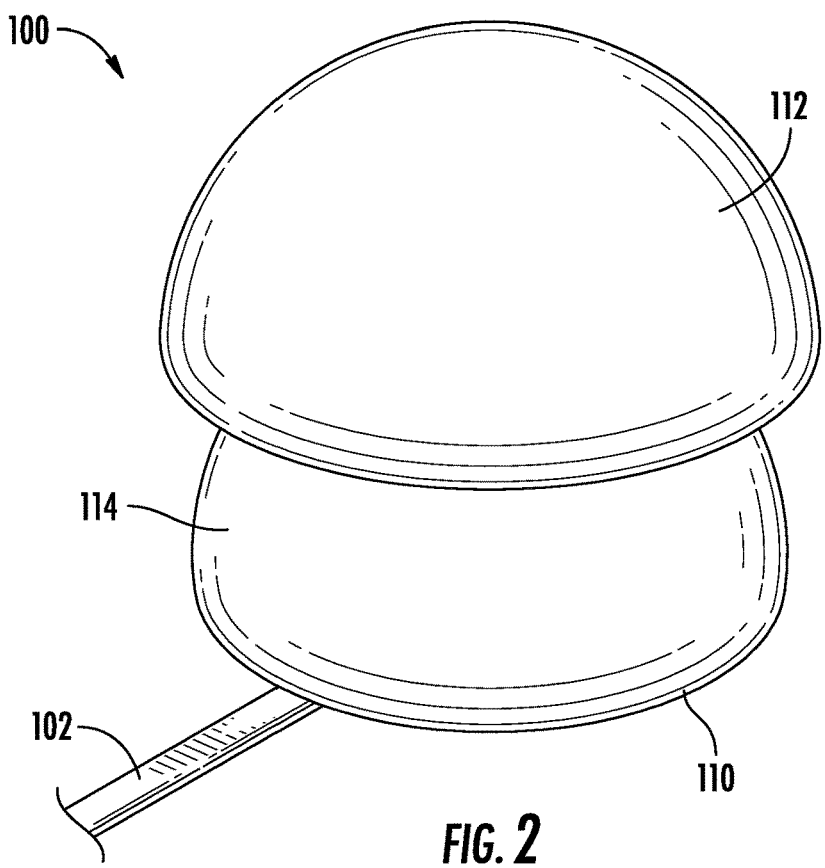
FIG. 2 is a perspective view of a system for acoustic behavior feedback according to an example embodiment of the present subject matter.
Figure 3:
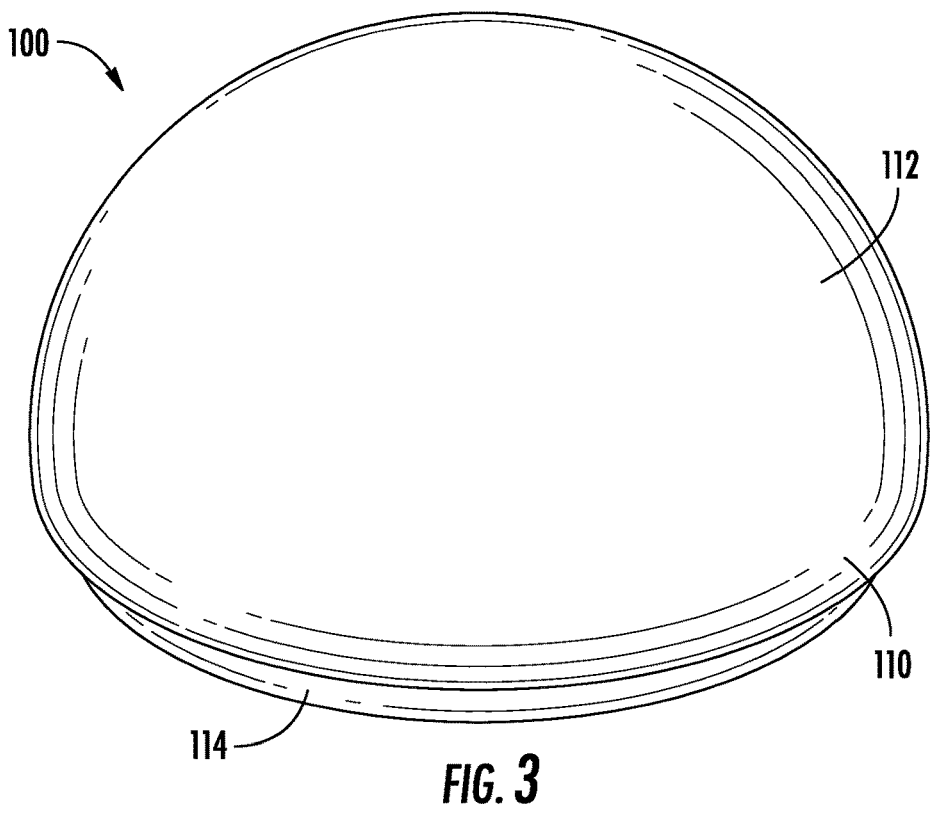
FIG. 3 is another perspective view of the example system of FIG. 2.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Generally, the present disclosure is directed to systems and methods for acoustic behavior feedback. Using the systems and methods according to example aspects of the present subject matter can assist with allowing users in an open office environment to participate in in-person and/or virtual collaboration in shared spaces or at a desk with reduced concern about disturbing neighbors. The systems and methods can include constantly measuring the noise in a room, e.g., generated by an individual or group, then feeding back cues on whether the noise is at a level that is potentially distracting to others in adjacent areas. In response to the feedback, the user can modulate their acoustic behavior in order to facilitate productivity in the shared workspace. The system and method can be inexpensive and non-invasive and assist users with actively participating in collaboration, being a better neighbor, and reducing the overall sound level down in the shared workspace.

FIG. 1 is a top plan view of a workspace 10 and systems 100 for acoustic behavior feedback according to an example embodiment of the present subject matter. As shown in FIG. 1, workspace 10 may include a plurality of desks 20 and a plurality of chairs 30, at which workers may conduct various tasks. Desks 20 may be suitable desks, such as standing desks and/or sitting desks, and chairs 30 may be suitable chairs, such as rolling office chairs and/or stools.

Desks 20 and chairs 30 may be distributed within workspace 10. For instance, the desks 20 and chairs 30 within workspace 10 may be arranged in rows and/or columns. In the example embodiment shown in FIG. 1, desks 20 include four (4) desks 20, and chairs 30 include four (4) chairs 30. In some example embodiments, workspace 10 may each include no less than four (2) desks 20 and chairs 30 and no greater than fifty (50) desks 20 and chairs 30. It will be understood that the arrangement and number of desks 20 and chairs 30 shown in FIG. 1 is provided by way of example only and that the present subject matter may be used in or with other suitable arrangement and number of desks 20 and chairs 30 in alternative example embodiments.

The sizing of workspace 10 may be varied. For instance, in example embodiments, workspace 10 may be no less than ten square meters (10 m$^2$) and no greater than five hundred square meters (500 m$^2$), such as about one hundred square meters (100 m$^2$). Moreover, workspace 10 may be laid out in an "open office" floor plan for desks 20 and chairs 30. The desks 20 and chairs 30 may also be laid out with the assumption that workers are desks 20 and chairs 30 in workspace 10 may frequently conduct calls, such as telephone calls or video calls.

User productivity within workspace 10 may be significantly affected by ambient noise. Thus, as discussed in greater detail below, one or more systems 100 may be provided within workspace. For example, a respective system 100 may be provided on each desk 20. System 100 may be configured for acoustic behavior feedback, e.g., in order to reduce the ambient noise within workspace 10.

Figure 4:
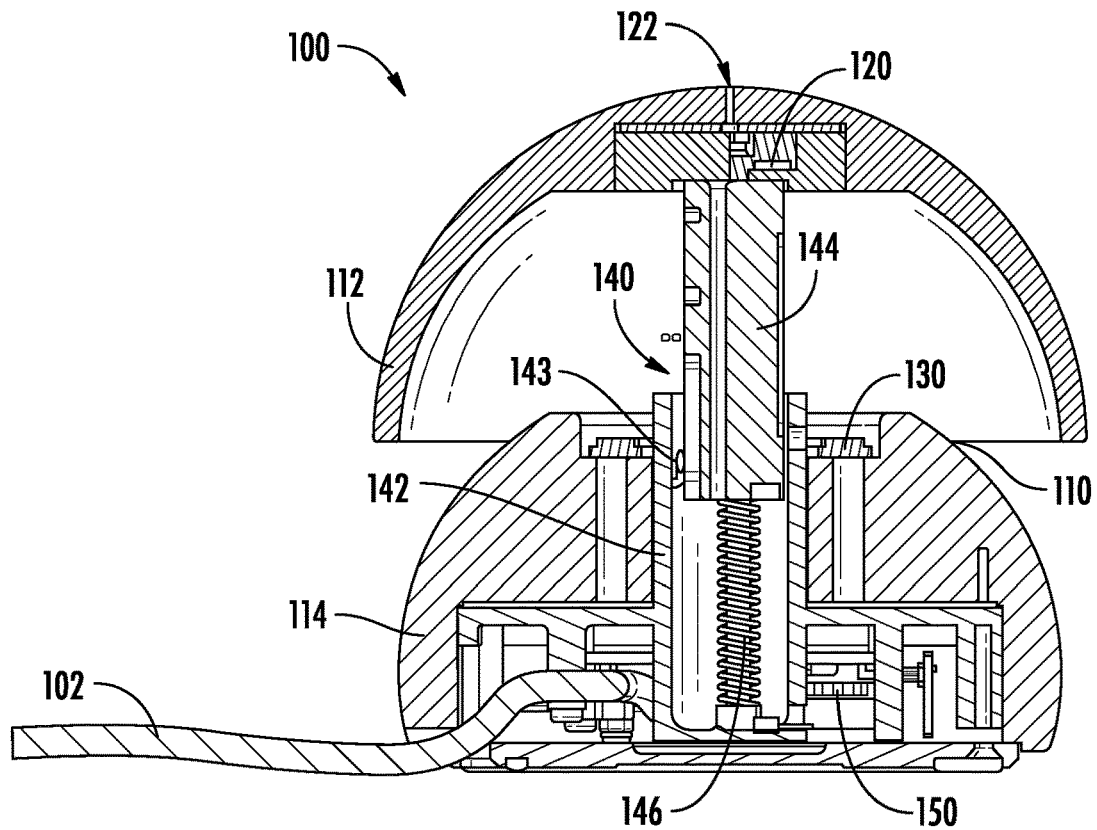
FIG. 4 is a section view of the example system of FIG. 2.
Figure 5:
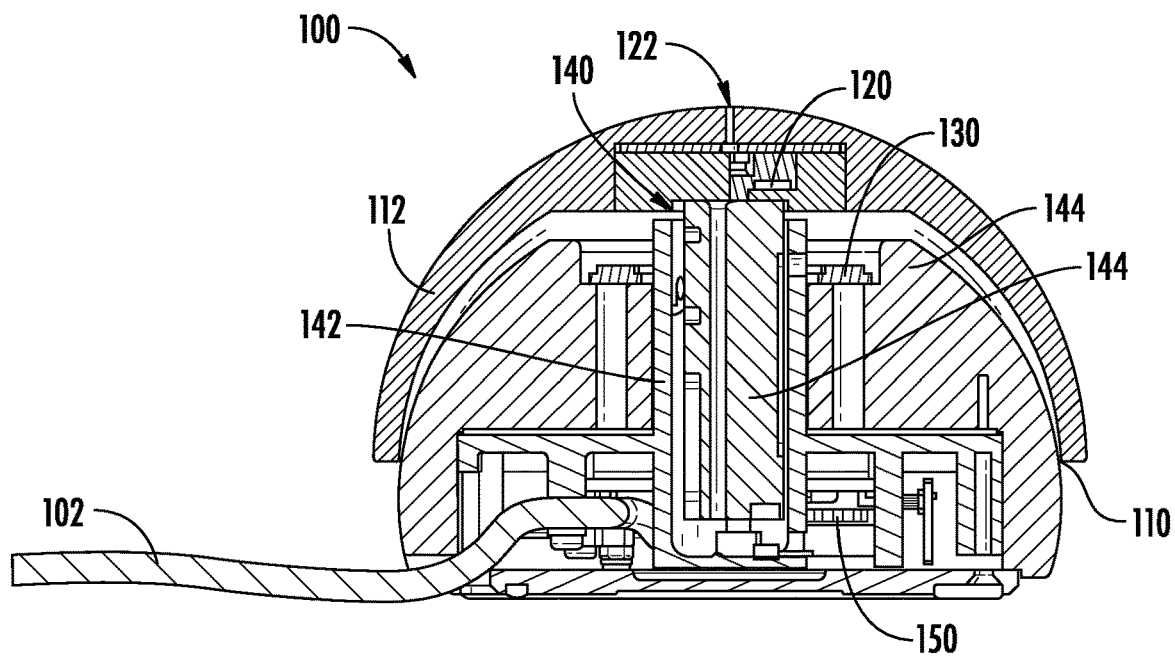
FIG. 5 is a section view of the example system of FIG. 3.
Figure 6:
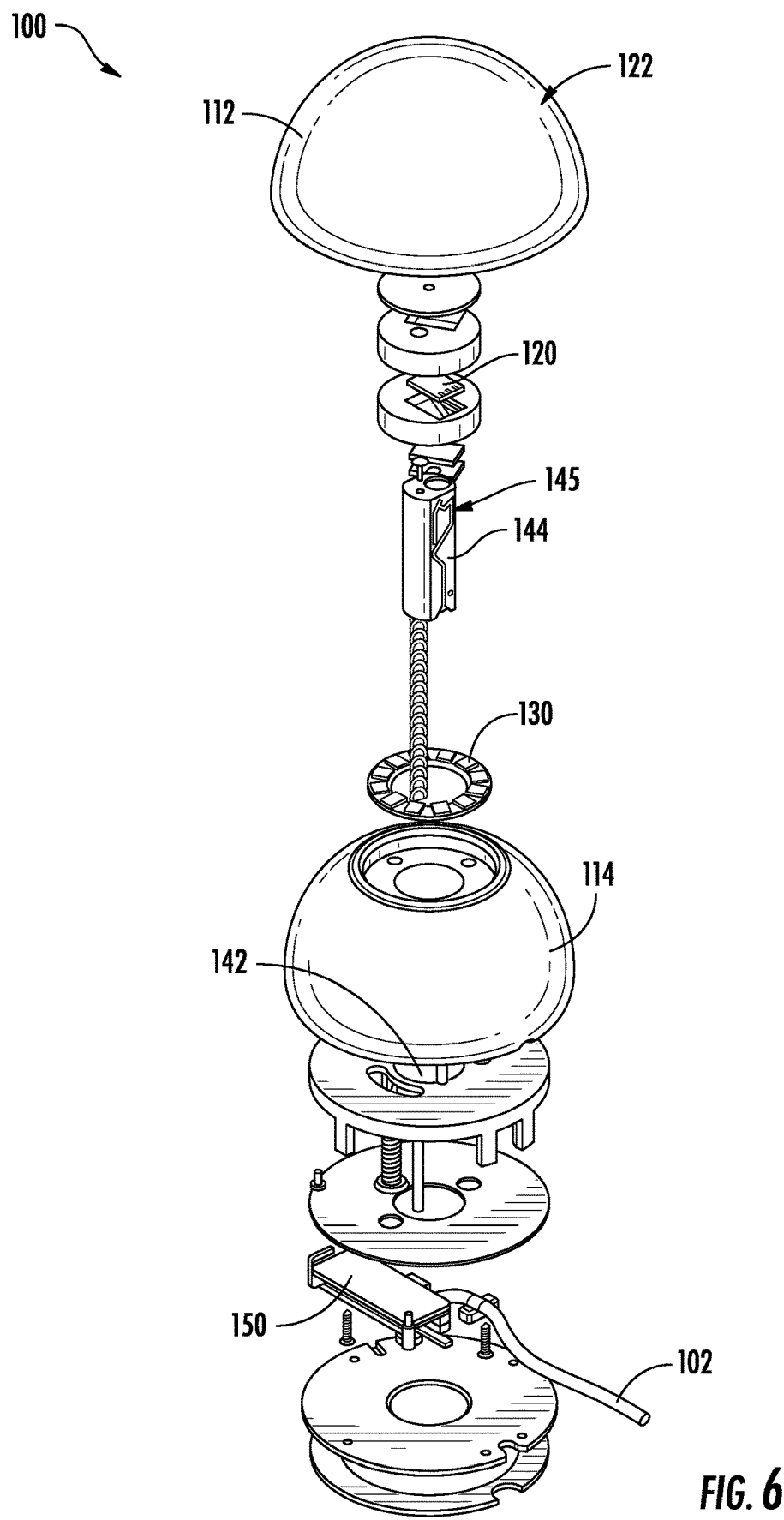
FIG. 6 is an exploded view of the example system of FIG. 2.

FIGS. 2 through 6 are various views of a system 100 for acoustic behavior feedback according to an example embodiment of the present subject matter. As shown in FIGS. 4 through 6, system 100 includes a housing 110, a microphone 120, and a light emitter 130. Housing 110 may be configured for containing or enclosing various components of system 100, such as microphone 120 and light emitter 130. In example embodiments, housing 110 may include a top cover or button 112 and a bottom stand or base 114. Base 114 may be configured for resting on a surface, such as a top of one of desks 20 (FIG. 1). Button 112 may be movably mounted to base 114. For example, button 112 may be translatable between an extended position (FIGS. 2 and 4) and a retracted position (FIGS. 3 and 5) relative to base 114. As discussed in greater detail below, light emitter 130 may deactivated and thus inoperable to emit light in the retracted position. Conversely, light emitter 130 may activatable and operable to emit light in the extended position.

Microphone 120 may be positioned and configured to collect ambient sound around the system 100. For example, housing 110 may be positioned on one of desks 20, and microphone 120 may thus be positioned and configured to collect sound generated by a worker sitting in the chair 30 at the desk 20 with system 100. Moreover, the microphone 120 may collect the noise of the worker during a call or video conference, listening to music, talking to coworkers, and/or other activities. In example embodiments, microphone 120 may be mounted within button 112. Moreover, button 112 may define at least one passage or through-hole 122, and microphone 120 may be mounted within button 112 at through-hole 122. Sound waves may pass through button 112 via through-hole 122 to microphone 120. Thus, through-hole 122 may assist microphone 120 within housing 110 with collecting ambient sound around the system 100. It will be understood that microphone 120 may be mounted within base 112 or other locations in alternative example embodiments.

Light emitter 130 may be positioned and configured to emit light around the system 100. For example, as noted above, housing 110 may be positioned on one of desks 20 (FIG. 1), and light emitter 130 may thus be positioned and configured to emit light such that the light is visible to a worker sitting in the chair 30 at the desk 20 with system 100. Moreover, the worker may see the light emitted by light emitter 130 during a call or video conference, listening to music, talking to coworkers, and/or other noise making activities. Thus, e.g., as discussed in greater detail below, light emitter 130 may operate to emit light as a feedback cue for the worker at the desk 20 with system 100 based upon ambient sound around the system 100 collected by the microphone 120.

In example embodiments, as shown in FIGS. 4 and 5, a top portion of base 114 may have a semispherical shape, and button 112 may be shaped complementary to the top portion of base 114, e.g., such that an interior surface of button 112 also has a semispherical shape. Thus, e.g., the top portion of base 114 may be nested within button 112 in the retracted position. Light emitter 130 may be mounted within base 114. Moreover, light emitter 130 may be mounted at the top portion of base 114, e.g., below button 112. Thus, e.g., light emitted by light emitter 130 may be directed towards the interior surface of button 112. The light may reflect within the gap between button 112 and base 114. At the outer edge of button 112, the light emitted by light emitter 130 may escape housing 110 and be visible outside of housing 110. Such arrangement may assist with advantageously providing diffuse light distributed around the perimeter of system 100 (e.g., button 112). It will be understood that light emitter 130 may be mounted within button 112 or other locations in alternative example embodiments.

Light emitter 130 may be a suitable light emitting device. For example, light emitter 130 may include one or more of a light emitting diode, an incandescent bulb, a florescent bulb, etc. In the example embodiment shown in FIG. 6, light emitter 130 may include a plurality of light emitting diodes (LEDs), e.g., distributed in a ring. System 100 may also include a power cord 102, e.g., connectable to a wall outlet, for supplying electrical power to components of system 100, such as microphone 120, light emitter 130, a controller 150, etc. In alternative example embodiments, system 100 may include a battery or other power sources for supplying electrical power to the components of system 100.

As shown in FIGS. 4 through 6, system 100 may include a push locking mechanism 140). As noted above, button 112 may be translatable between the extended position (FIGS. 2 and 4) and the retracted position (FIGS. 3 and 5) relative to base 114. Push locking mechanism 140 may be configured for securing button 112 in either the extended position or the retracted position. Moreover, push locking mechanism 140) may maintain button 112 in a current one of the extended and retracted positions until a user pushes button 112 towards base 114, at which point the push locking mechanism 140 adjusts the button 112 to the other of the extended and retracted positions.

Push locking mechanism 140 may include a cam follower support 142, a cam track post 144, and a spring 146. A cam 143 (FIG. 4) of the cam follower support 142 may be received within and slide on a path 145 (FIG. 6) defined by the cam track post 144. Movement of the cam 143 of the cam follower support 142 within the path 145 defined by the cam track post 144 may selectively secure the button 112 in the extended and retracted positions. Spring 146 may bias the cam 143 of the cam follower support 142 into recesses in the path 145 corresponding to the extended and retracted positions and thereby assist within holding button 112 in the extended and retracted positions until the user pushes button 112 towards base 114 and further translates the cam 143 of the cam follower support 142 within the path 145 defined by cam track post 144.

With reference to FIGS. 4 through 6, operation of system 100 may be regulated by a controller 150 that is operatively coupled to various other components, as will be described below. Generally, controller 150 may operate various components of system 100. Controller 150 may include a memory and one or more microprocessors, CPUs or the like, such as general or special purpose microprocessors operable to execute programming instructions or micro-control code associated with operation of system 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 150 may be constructed without using a microprocessor (e.g., using a combination of discrete analog or digital logic circuitry: such as switches, amplifiers, integrators, comparators, flip-flops, AND gates, and the like) to perform control functionality instead of relying upon software.

Controller 150 may be received positioned within housing 110, e.g., on base 114. For example, controller 150 may be mounted at a bottom portion of base 114. Input/output ("I/O") signals may be routed between controller 150 and various operational components of system 100. For example, microphones 120 and light emitters 130 may be in communication with controller 150 via one or more signal lines, shared communication busses, or wirelessly. It will be understood that controller 150 may be mounted within button 112 or other locations in alternative example embodiments.

Controller 150 may also be configured for communicating with one or more remove devices, such as computers or servers, via a network. In general, controller 150 may be configured for permitting interaction, data transfer, and other communications between system 100 and the one or more external devices. For example, this communication may be used to provide and receive operating parameters, user instructions or notifications, performance characteristics, user preferences, or any other suitable information for improved performance of system 100. In addition, it should be appreciated that controller 150 may transfer data or other information to improve user interaction with system 100.

In general, communication between controller 150 and the external device(s) may be carried using any type of wired or wireless connection and using any suitable type of communication network, non-limiting examples of which are provided below. For example, the external device(s) may be in direct or indirect communication with system 100 through any suitable wired or wireless communication connections or interfaces, such as a network. For example, the network may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

Figure 7:
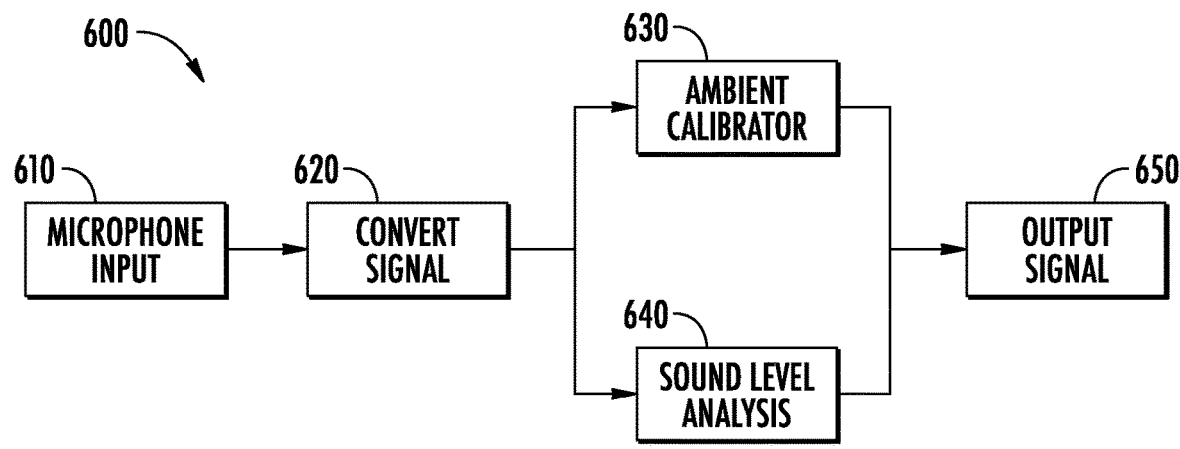
FIG. 7 is a flow chart for a method for acoustic behavior feedback according to an example embodiment of the present subject matter.

Turning now to FIG. 7, various example aspects of a method 600 for acoustic behavior feedback will be described. Method 600 will be described in greater detail below in the context of system 100 (FIG. 1). However, it will be understood that method 600 may be used in or with other suitable systems in alternative example embodiments. Controller 150 may be programmed or configured to implement method 600. Method 600 may assist with providing feedback cues on whether ambient noise around a user is at a level that is potentially distracting to others in adjacent areas.

At 610, ambient sound data corresponding to ambient sound in workspace 10 around system 100 may be acquired by microphone 120 in housing 110 on desk 20. Thus, e.g., microphone 120 of system 100 may record and output the ambient sound data corresponding to ambient sound in workspace 10 around system 100 at 610. The ambient sound data at 610 may include sounds from various sources around system 100, such as a worker sitting at the one of desks 20 with the system 100 (e.g., talking, moving, typing, etc.), music, HVAC noise, and other background noises. As an example, controller 150 may receive analog signals from microphone 120 at 610. At 620, the analog signals from microphone 120 received at 610 may be converted to digital. For example, controller 150 may include an analog-to-digital converter for converting the analog signals from microphone 120 to digital signals at 620.

Method 600 may also include analyzing the ambient sound data. For example, a level or intensity of the ambient sound data may be determined. For instance, a rolling window of the ambient sound data may be analyzed, e.g., to determine an average level, a minimum level, a maximum level, etc. during the rolling window. As a specific example, an array of the ambient sound data may be created, and the microphone level (e.g., on a scale from 0 to 1024) may be read into the array. A minimum value and a maximum value of the ambient sound data may be selected from the array, and a difference between the minimum and maximum values may be established, e.g., an average level of the ambient sound data at each sample of the ambient sound data may correspond to the difference between the minimum and maximum values during a rolling window.

At 630, system 100 may be calibrated based upon the ambient sound data. For example, ambient sound data collected during a calibration period may be used to calculate reference background noise. As a specific example, the ambient sound data at each sample during a calibration period, e.g., ten second (10) s), thirty seconds (30 s), sixty seconds (60 s), etc., may be sorted by magnitude. A threshold percentile of the samples may be selected to establish a background noise level. For instance, a ninetieth percentile (L90) noise level may be used to establish the background noise level. Thus, e.g., the value of the samples one-tenth of the way through the samples may be identified in order to establish the background noise level 90% of the time (L90). Offset values may be added to the background noise level, such as the ninetieth percentile (L90) noise level, to establish threshold values for acoustic behavior feedback. The offset values may correspond to static or predetermined offsets that correspond to specific decibel level differences. The offset values may include one or more of a low offset value, a middle offset value, and a high offset value such that the threshold values may include one or more of a low threshold value, a middle threshold value, and a high threshold value. As may be seen from the above, the background noise level may be dynamic and adjust with the ambient sound data from the environment around system 100 over time, e.g., rather than remaining static. Moreover, at 630, system 100 may automatically calibrate (e.g., and periodically recalibrate) to capture the background noise level in workspace 10, and threshold sound levels, such as voltage values, for acoustic behavior feedback may be established based on the background noise level.

At 640, system 100 may analyze the ambient sound data and compare the ambient sound data to threshold sound levels. As an example, at 640, method 600 may include processing the ambient sound data from 610, 620 and comparing the ambient sound data with the threshold sound levels for speech around the system 100. The analysis at 640 may include one or more of an averaging of the ambient sound data and peak filtering of the ambient sound data.

Regarding the peak filtering, controller 150 may apply a peak filter to the ambient sound data from 610, 620 and determine whether the peak filtered ambient sound data exceeds a threshold for longer than a predetermined duration. The peak filter may pass sound levels within the ambient sound data that exceed the threshold. By checking whether the peak filtered ambient sound data exceeds the threshold for longer than the predetermined duration, brief or transient loud noise, such as claps, sneezes, etc., around system 100 may be ignored by method 600 while acoustic behavior feedback may be subsequently generated when there is sustained loud noise around system 100, such as talking, music, etc.

Regarding the averaging of the ambient sound data, the average level of the ambient sound data may be calculated during a rolling window. The average level of the ambient sound data may then be compared to the threshold sound levels. As noted above, the threshold values may include one or more of the low threshold value, the middle threshold value, and the high threshold value. Thus, method 600 may include comparing the average level of the ambient sound data to the low threshold value, the middle threshold value, and/or the high threshold value. When the average level of the ambient sound data is greater than the low threshold value but less than the middle threshold value, it may be determined that the background noise level is likely suitable for most workers and is unlikely to limit productivity, e.g., and subsequent acoustic behavior feedback may reflect this condition. Conversely, when the average level of the ambient sound data is greater than the middle threshold value but less than the high threshold value, it may be determined that the background noise level is likely unsuitable for some workers and may limit productivity, e.g., and subsequent acoustic behavior feedback may reflect this condition. Moreover, when the average level of the ambient sound data is greater than the high threshold value, it may be determined that the background noise level is likely unsuitable for most workers and is likely to limit productivity, e.g., and subsequent acoustic behavior feedback may reflect this condition. It will be understood that one or more additional threshold values may be provided in alternative example embodiments, e.g., in order to provide additional resolution for acoustic behavior feedback.

At 650, one of a plurality of settings for light emitter 130 may be selected based at least in part on the comparison between the ambient sound data and threshold sound level, and, e.g., light emitter 130 may be operated at the selected one of the plurality of settings. Each of the plurality of settings for light emitter 130 may correspond to a respective sound level alert as feedback for at least one person that is proximate system 100, e.g., microphone 120 and light emitter 130. Thus, e.g., when the average level of the ambient sound data is greater than a threshold sound level, one of a plurality of settings for light emitter 130 may be selected in order provide a feedback cue for the worker at the desk 20 with system 100 that ambient sound, such as talking, moving, typing, etc. by the worker, is potentially distracting to nearby colleagues. Moreover, controller 150 may be configured to increase to a higher one of the plurality of settings when the ambient sound data is greater than the threshold sound level and/or to decrease to a lower one of the plurality of settings when the ambient sound data is less than the threshold sound level.

In example embodiments, the light emitter 130 may be operable at a respective color for each of the plurality of settings. For instance, the plurality of settings for the light emitter 130 may include a spectrum of colors, e.g., from red to green. Thus, e.g., when the average level of the ambient sound data is greater than the low threshold value but less than the middle threshold value, the light emitter 130 may be operable to emit green light as acoustic behavior feedback that the background noise level at system 100 is likely suitable for most workers and is unlikely to limit productivity. Conversely, when the average level of the ambient sound data is greater than the middle threshold value but less than the high threshold value, the light emitter 130 may be operable to emit orange light as acoustic behavior feedback that the background noise level at system 100 is likely unsuitable for some workers and may limit productivity. Moreover, when the average level of the ambient sound data is greater than the high threshold value, the light emitter 130 may be operable to emit red light as acoustic behavior feedback that the background noise level is likely unsuitable for most workers and is likely to limit productivity. Thus, the change in color by light emitter 130 may inform the viewer of system 100 of the increasingly noisy environment and encourage the viewer to take remedial action to reduce the ambient noise, e.g., to speak more quietly, turn down music, etc. It will be understood that one or more additional threshold values and settings for light emitter 130 may be provided in alternative example embodiments, e.g., in order to provide additional resolution for acoustic behavior feedback.

At 650, method 600 may include operating light emitter 130 at the selected one of the plurality of settings for no less than a minimum duration (e.g., five second (5 s), ten second (10) s), etc.) after adjusting the light emitter 130 to the selected one of the plurality of settings. Ensuring operation of the light emitter 130 for the threshold duration may advantageously avoid rapid switching of light emitter 130 between settings as the ambient noise changes around system 100.

As may be seen from the above, the present subject matter may advantageously provide a behavioral nudge as feedback on sound levels in real time, e.g., for a shared workspace. Response thresholds may be calibrated to provide real-time information about the impact of speech volume. The feedback may be selectively operated, and users can take ownership of their sound production by using the feedback nudge. Moreover, users may choose to use the nudge or to mute the feedback at any time. The option to mute the light emissions and feedback may advantageously reduce unnecessary stimuli and assist the feedback with maintaining efficacy without becoming visual noise.

FIG. 7 depict steps performed in a particular order for purposes of illustration and discussion. Those of ordinary skill in the art, using the disclosures provided herein, will understand that the steps of any of the methods discussed herein may be adapted, rearranged, expanded, omitted, or modified in various ways without deviating from the scope of the present disclosure. Moreover, although aspects of method 600 are explained using system 100 as an example, it should be appreciated that these methods may be applied to the operation of any suitable system.

Figure 8:
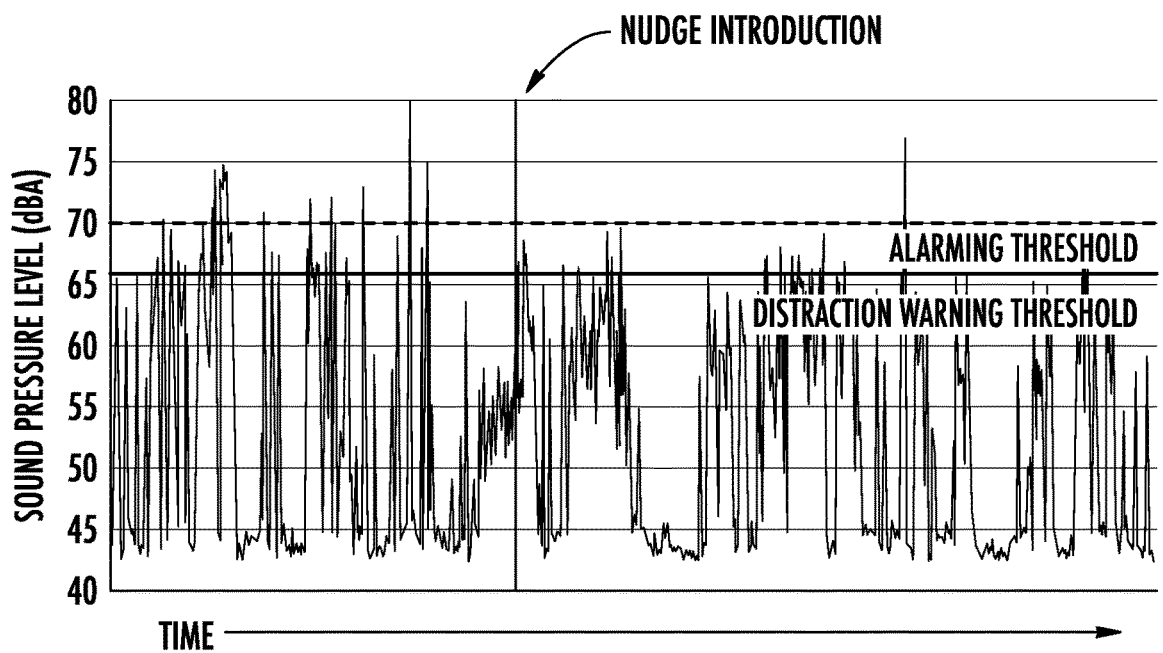
FIG. 8 is a plot of sound pressure level versus time during an example method for acoustic behavior feedback according to an example embodiment of the present subject matter.

Turning now to FIG. 8, an example plot of sound pressure level versus time during an example method for acoustic behavior feedback is provided. As shown, system 100 signals to a user when the user has exceeded set sound level thresholds by lighting up, flashing, etc. System 100 calculates a running average of sound levels and compares the running average to the sound level thresholds, i.e., the "distraction warning threshold" and the "alarming threshold" in FIG. 9. When the sound level remains above the threshold for long enough, e.g., longer than a cough and/or a hand clap, system 100 changes light emitter 130 to inform the user that the user is getting loud.

In the plot of FIG. 8, a participant at a desk had a conversation with a remote partner, and, after a few minutes, the acoustic behavior feedback was introduced by system 100, which was placed on the desk, and the conversation continued. To the left of the dark line (labeled "nudge introduction") is the sound level of the participant before introduction of the acoustic behavior feedback. In general, the participant talked loudly enough that system 100 signaled the participant to quiet. After introduction of the acoustic behavior feedback, the peaks in the participant speech levels decreased overall, while hovering around the distraction warning threshold. This indicates that the participant took the suggestion from the system 100 to talk more quietly.

Figure 9:
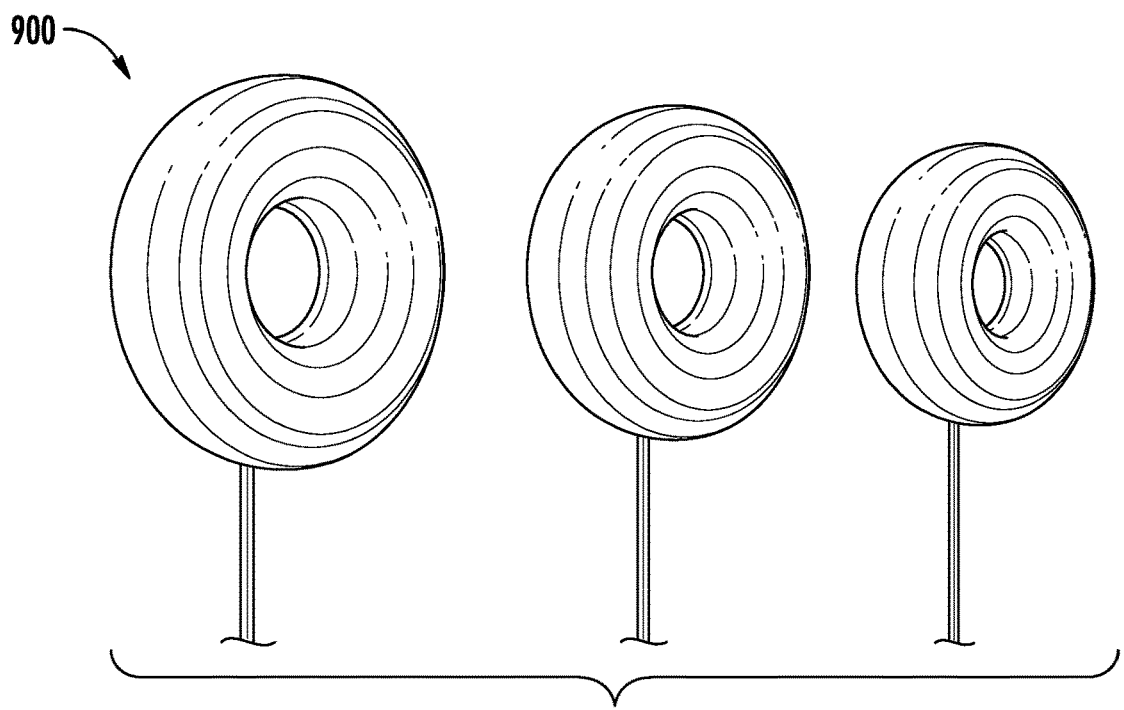
FIGS. 9 through 12 are each views of systems for acoustic behavior feedback according to a respective example embodiment of the present subject matter.
Figure 10:
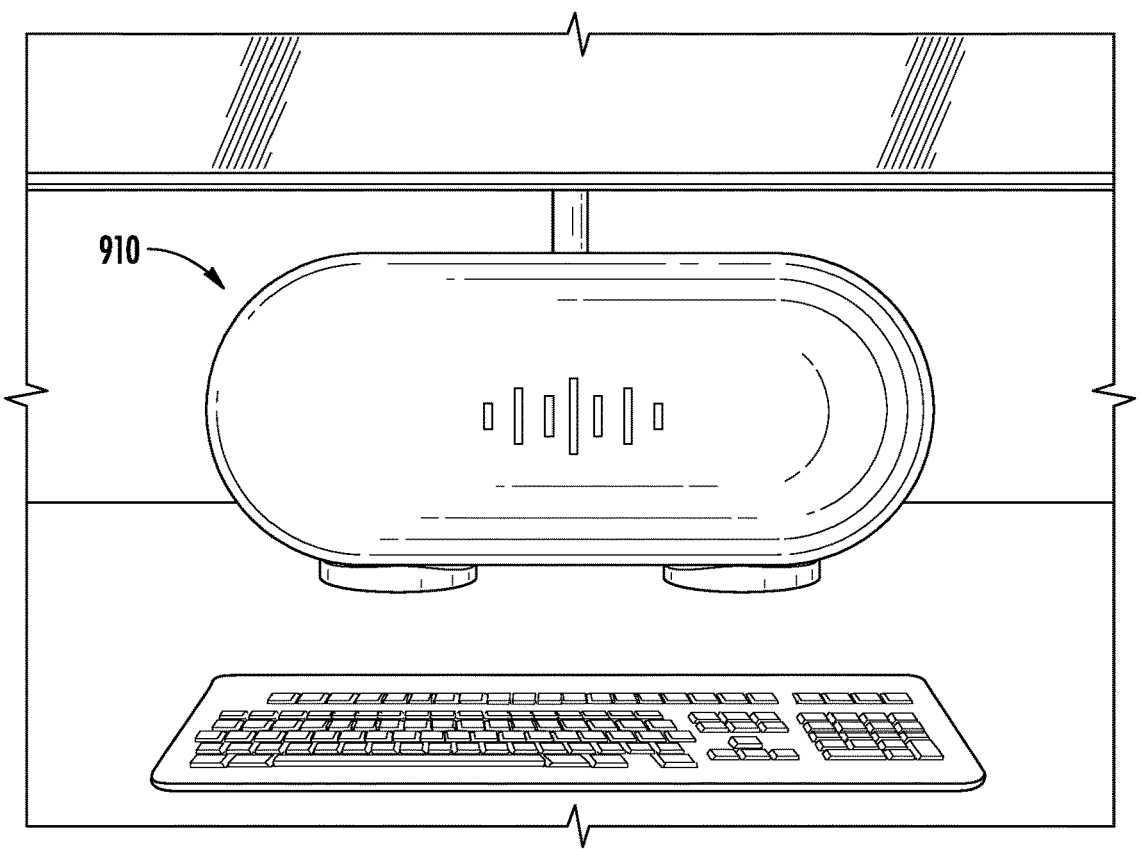
Figure 11:
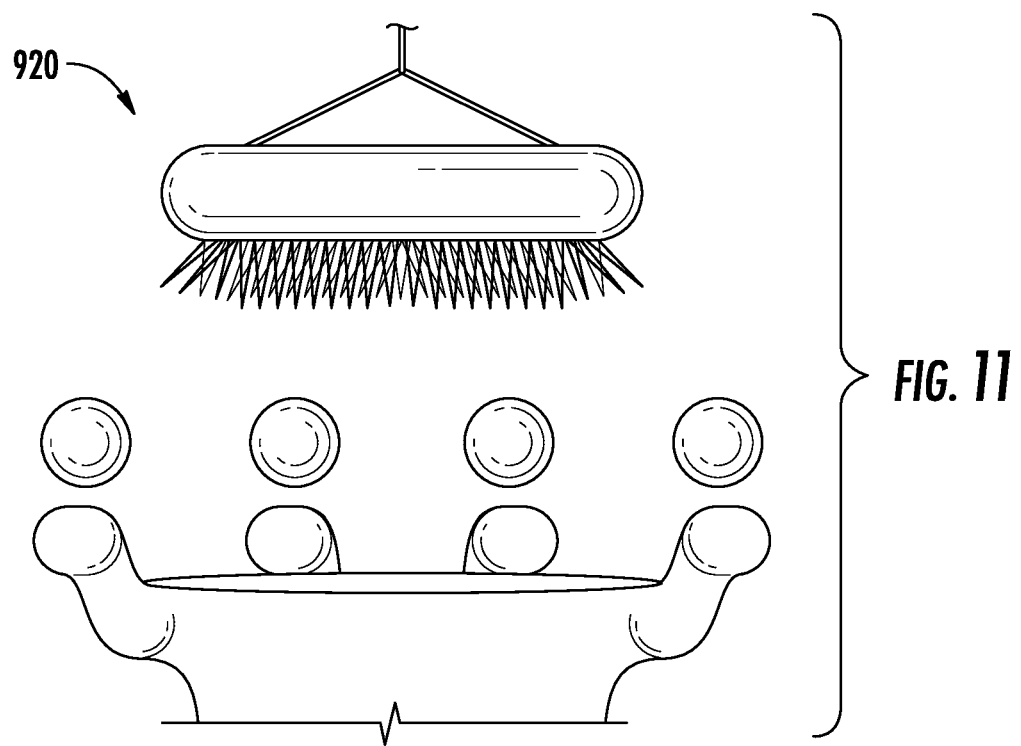
Figure 12:
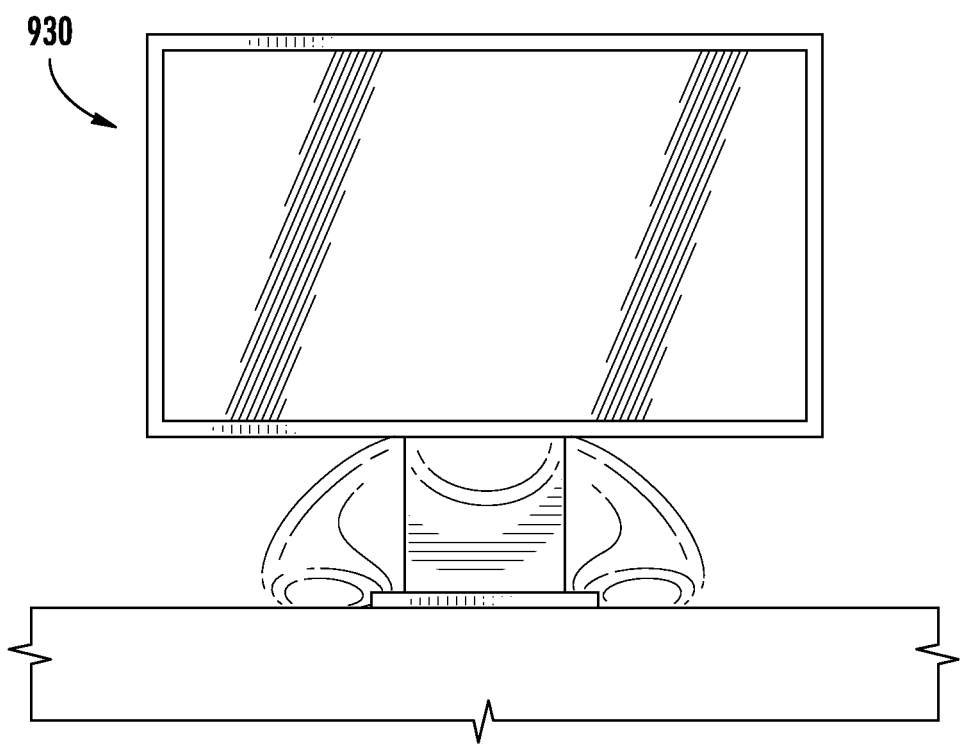

FIGS. 9 through 12 are each views of systems for acoustic behavior feedback according to a respective example embodiment of the present subject matter. As shown in FIG. 9, a system 900 (with e.g., microphone 120, light emitter 130, and controller 150) may be incorporated within multiple housings, e.g., that are mountable on a wall, e.g., adjacent a desk, within a conference room, etc. As shown in FIG. 10, a system 910 (with e.g., microphone 120, light emitter 130, and controller 150) may be incorporated within a speaker on a desk. As shown in FIG. 11, a system 920 (with e.g., microphone 120, light emitter 130, and controller 150) may be incorporated within a light fixture, e.g., over a desk, in a conference room, etc. As shown in FIG. 12, a system 930 (with e.g., microphone 120, light emitter 130, and controller 150) may be incorporated within a computer monitor or display, e.g., at a desk, in a conference room, etc.

Each of the various systems 900, 910, 920, 930 may operate in the same or similar manner to that described above for system 100 and/or for method 600. Accordingly, it will be understood that the present subject matter may be incorporated into various physical housings in alternative example embodiments.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

Example Embodiments

First example embodiment: A system for acoustic behavior feedback, comprising: a light emitter: a microphone: one or more processors: and one or more non-transitory computer-readable media that store instructions that, when executed by the one or more processors, cause the one or more processors to perform operations, the operations comprising comparing ambient sound data from the microphone to a threshold sound level, and selecting one of a plurality of settings for the light emitter based at least in part on the comparison between the ambient sound data and threshold sound level, wherein each of the plurality of settings corresponds to a respective sound level alert as feedback for at least one person proximate the microphone and the light emitter.

Second example embodiment: The system of the first example embodiment, further comprising a housing, wherein the light emitter, the microphone, the one or more processors, and the one or more non-transitory computer-readable media are disposed within the housing.

Third example embodiment: The system of the second example embodiment, wherein the housing comprises a base and a button, the button mounted on the base such that the button is adjustable between an activated position and a deactivated position, the light emitter configured such that the light emitter is operable to emit light in the activated position and is inoperable in the deactivated position.

Fourth example embodiment: The system of any one of the first through third example embodiments, wherein the light emitter comprises one or more light emitting diodes.

Fifth example embodiment: The system of any one of the first through fourth example embodiments, wherein comparing the ambient sound data from the microphone to the threshold sound level comprises: averaging the ambient sound data from the microphone over a rolling window: and comparing the rolling average of the ambient sound data to the threshold sound level.

Sixth example embodiment: The system of the fifth example embodiment, wherein the operations further comprise peak filtering the ambient sound data, and wherein comparing the ambient sound data comprises comparing the ambient sound data when the peak filtered ambient sound data is greater than a threshold for longer than a predetermined duration.

Seventh example embodiment: The system of any one of the first through sixth example embodiments, wherein the operations further comprise operating the light emitter at the one of the plurality of settings for no less than a minimum duration after adjusting the light emitter to the one of the plurality of settings.

Eighth example embodiment: The system of any one of the first through seventh example embodiments, wherein selecting the one of the plurality of settings for the light emitter comprises: increasing to a higher one of the plurality of settings when the ambient sound data is greater than the threshold sound level: or decreasing to a lower one of the plurality of settings when the ambient sound data is less than the threshold sound level.

Ninth example embodiment: The system of any one of the first through eighth example embodiments, wherein the plurality of settings for the light emitter comprises a respective color for each of the plurality of settings.

Tenth example embodiment: The system of any one of the first through ninth example embodiments, wherein the plurality of settings for the light emitter comprises a spectrum of colors from red to green.

Eleventh example embodiment: A method for acoustic behavior feedback, comprising: comparing ambient sound data from a microphone to a threshold sound level; and selecting one of a plurality of settings for a light emitter based at least in part on the comparison between the ambient sound data and threshold sound level, wherein each of the plurality of settings corresponds to a respective sound level alert as feedback for at least one person proximate the microphone and the light emitter.

Twelfth example embodiment: The method of the eleventh example embodiment, wherein the light emitter and the microphone are disposed within a housing.

Thirteenth example embodiment: The method of the twelfth example embodiment, wherein the housing comprises a base and a button, the button mounted on the base such that the button is adjustable between an activated position and a deactivated position, the light emitter configured such that the light emitter is operable to emit light in the activated position and is inoperable in the deactivated position.

Fourteenth example embodiment: The method of any one of the eleventh through thirteenth example embodiments, wherein the light emitter comprises one or more light emitting diodes.

Fifteenth example embodiment: The method of any one of the eleventh through fourteenth example embodiments, wherein comparing the ambient sound data from the microphone to the threshold sound level comprises: averaging the ambient sound data from the microphone over a rolling window: and comparing the rolling average of the ambient sound data to the threshold sound level.

Sixteenth example embodiment: The method of the fifteenth example embodiment, further comprising peak filtering the ambient sound data, and wherein comparing the ambient sound data comprises comparing the ambient sound data when the peak filtered ambient sound data is greater than a threshold for longer than a predetermined duration.

Seventeenth example embodiment: The method of any one of the eleventh through sixteenth example embodiments, further comprising operating the light emitter at the one of a plurality of settings for no less than a minimum duration after adjusting the light emitter to the one of the plurality of settings.

Eighteenth example embodiment: The method of any one of the eleventh through seventeenth example embodiments, wherein selecting the one of the plurality of settings for the light emitter comprises: increasing to a higher one of the plurality of settings when the ambient sound data is greater than the threshold sound level: or decreasing to a lower one of the plurality of settings when the ambient sound data is less than the threshold sound level.

Nineteenth example embodiment: The method of any one of the eleventh through eighteenth example embodiments, wherein the plurality of settings for the light emitter comprises a respective color for each of the plurality of settings.

Twentieth example embodiment: The method of any one of the eleventh through nineteenth example embodiments, wherein the plurality of settings for the light emitter comprises a spectrum of colors from red to green.

What is claimed is:

1. A system for acoustic behavior feedback, comprising:
   a light emitter;
   a microphone;
   one or more processors; and
   one or more non-transitory computer-readable media that store instructions that, when executed by the one or more processors, cause the one or more processors to perform operations, the operations comprising
   comparing ambient sound data from the microphone to a threshold sound level,
   selecting one of a plurality of settings for the light emitter based at least in part on the comparison between the ambient sound data and threshold sound level, wherein each of the plurality of settings corresponds to a respective sound level alert as feedback for at least one person proximate the microphone and the light emitter, and
   operating the light emitter at the selected one of the plurality of settings to emit a visual lighting cue for the at least one person viewing the light emitter.

2. The system of claim 1, further comprising a housing, wherein the light emitter, the microphone, the one or more processors, and the one or more non-transitory computer-readable media are disposed within the housing.

3. The system of claim 2, wherein the housing comprises a base and a button, the button mounted on the base such that the button is adjustable between an activated position and a deactivated position, the light emitter configured such that the light emitter is operable to emit light in the activated position and is inoperable in the deactivated position.

4. The system of claim 1, wherein the light emitter comprises one or more light emitting diodes.

5. The system of claim 1, wherein comparing the ambient sound data from the microphone to the threshold sound level comprises:
   averaging the ambient sound data from the microphone over a rolling window; and
   comparing the rolling average of the ambient sound data to the threshold sound level.

6. The system of claim 5, wherein the operations further comprise peak filtering the ambient sound data, and wherein comparing the ambient sound data comprises comparing the ambient sound data when the peak filtered ambient sound data is greater than a threshold for longer than a predetermined duration.

7. The system of claim 1, wherein the operations further comprise operating the light emitter at the one of the plurality of settings for no less than a minimum duration after adjusting the light emitter to the one of the plurality of settings.

8. The system of claim 1, wherein selecting the one of the plurality of settings for the light emitter comprises:
   increasing to a higher one of the plurality of settings when the ambient sound data is greater than the threshold sound level; or decreasing to a lower one of the plurality of settings when the ambient sound data is less than the threshold sound level.

9. The system of claim 1, wherein the plurality of settings for the light emitter comprises a respective color for each of the plurality of settings.

10. The system of claim 1, wherein the plurality of settings for the light emitter comprises a spectrum of colors from red to green.

11. A method for acoustic behavior feedback, comprising:
comparing ambient sound data from a microphone to a threshold sound level;
selecting one of a plurality of settings for a light emitter based at least in part on the comparison between the ambient sound data and threshold sound level, wherein each of the plurality of settings corresponds to a respective sound level alert as feedback for at least one person proximate the microphone and the light emitter; and
operating the light emitter at the selected one of the plurality of settings to emit a visual lighting cue for the at least one person viewing the light emitter.

12. The method of claim 11, wherein the light emitter and the microphone are disposed within a housing.

13. The method of claim 12, wherein the housing comprises a base and a button, the button mounted on the base such that the button is adjustable between an activated position and a deactivated position, the light emitter configured such that the light emitter is operable to emit light in the activated position and is inoperable in the deactivated position.

14. The method of claim 11, wherein the light emitter comprises one or more light emitting diodes.

15. The method of claim 11, wherein comparing the ambient sound data from the microphone to the threshold sound level comprises:
averaging the ambient sound data from the microphone over a rolling window; and
comparing the rolling average of the ambient sound data to the threshold sound level.

16. The method of claim 15, further comprising peak filtering the ambient sound data, and wherein comparing the ambient sound data comprises comparing the ambient sound data when the peak filtered ambient sound data is greater than a threshold for longer than a predetermined duration.

17. The method of claim 11, further comprising operating the light emitter at the one of a plurality of settings for no less than a minimum duration after adjusting the light emitter to the one of the plurality of settings.

18. The method of claim 11, wherein selecting the one of the plurality of settings for the light emitter comprises:
increasing to a higher one of the plurality of settings when the ambient sound data is greater than the threshold sound level; or
decreasing to a lower one of the plurality of settings when the ambient sound data is less than the threshold sound level.

19. The method of claim 11, wherein the plurality of settings for the light emitter comprises a respective color for each of the plurality of settings.

20. The method of claim 11, wherein the plurality of settings for the light emitter comprises a spectrum of colors from red to green.

* * * * *